United States Patent [19]
Steiner et al.

[11] Patent Number: 6,042,775
[45] Date of Patent: Mar. 28, 2000

[54] SILVER RECLAMATION SYSTEM

[75] Inventors: Carl A. Steiner, Erie; Ricky L. Jackson, Union City, both of Pa.

[73] Assignee: TM Industrial Supply, Inc., Erie, Pa.

[21] Appl. No.: 09/015,277

[22] Filed: Jan. 29, 1998

[51] Int. Cl.⁷ .................................................. C22B 3/00
[52] U.S. Cl. ........................................ 266/101; 266/170
[58] Field of Search ................... 266/101, 170; 75/713

[56] References Cited

U.S. PATENT DOCUMENTS

| | | |
|---|---|---|
| 705,589 | 7/1902 | James . |
| 1,753,015 | 4/1930 | McGregor . |
| 2,291,209 | 7/1942 | Burkemer et al. ............... 204/248 |
| 3,840,217 | 10/1974 | MacKay ............................ 266/22 |
| 3,997,347 | 12/1976 | Parsonage ...................... 96/50 R |
| 4,021,319 | 5/1977 | Moeglich .......................... 204/96 |
| 4,213,600 | 7/1980 | Thompson, Jr. ................ 266/170 |
| 4,220,320 | 9/1980 | LeGrange ....................... 266/170 |
| 4,240,617 | 12/1980 | MacKay .......................... 266/170 |
| 4,294,434 | 10/1981 | Durkee ........................... 266/170 |
| 4,457,495 | 7/1984 | Eder et al. ...................... 266/170 |
| 4,608,177 | 8/1986 | Woog .............................. 210/738 |
| 4,874,530 | 10/1989 | Kobayashi et al. ............. 210/718 |
| 4,881,973 | 11/1989 | Williams ........................ 75/118 P |
| 4,997,166 | 3/1991 | Wiggins .......................... 266/170 |
| 5,004,212 | 4/1991 | Gutierrez ........................ 266/170 |
| 5,026,029 | 6/1991 | Peterson ......................... 266/170 |
| 5,112,390 | 5/1992 | MacKay ........................... 75/733 |
| 5,229,009 | 7/1993 | Woog .............................. 210/719 |
| 5,298,170 | 3/1994 | Woog .............................. 210/719 |
| 5,310,629 | 5/1994 | McGuckin et al. ............. 266/170 |
| 5,626,816 | 5/1997 | Fournier ......................... 266/101 |

*Primary Examiner*—Scott Kastler

[57] ABSTRACT

A silver reclamation system for use with photographic solution. The silver reclamation system includes a body containing a plurality of metallic members positioned within a flow chamber and a metallic mesh contained within the body. The photographic solution contacts the plurality of metallic members and the metallic mesh material thereby causing silver contained within the photographic solution to plate these members. Also, the metallic members cause silver in the photographic solution to crystallize. The crystallized silver can then be contained within a filter for processing.

16 Claims, 3 Drawing Sheets

SILVER RECLAMATION SYSTEM

BACKGROUND OF THE INVENTION

1) Field of the Invention

This invention pertains to waste processing and, more particularly, to an apparatus and method for removing silver from spent photographic solutions.

2) Description of the Prior Art

The chemistry associated with x-ray photography is well known. Film is coated with a silver emulsion, such as silver halide, which is exposed to x-ray energy. The exposed portion of the emulsion converts to metallic silver. The film is developed by treating it with an alkaline solution that makes the silver more visible. Thereafter, a fixer or photographic solution, which includes ammonium thiosulfate, is applied to the film that dissolves and carries away the silver emulsion that is not converted to metallic silver. The spent fixer contains significant amounts of silver.

It is common practice to recover silver in the fixer solution by replacing the silver ions with iron ions. Generally, this is accomplished by providing electric energy to the spent fixer solution to facilitate the iron transfer. Alternatively, non-electrical type systems have been developed, such as disclosed in U.S. Pat. No. 5,229,009. Under Environmental Protection Agency (EPA) guidelines, the silver content of the spent fixer must be below a certain value before the fixer can be discharged into a sewer. Although electric arrangements can operate satisfactorily, they are expensive to purchase and expensive to operate. The non-electric arrangements are very limited on the volume of spent solution that can be processed and, in many cases, cannot meet the EPA discharge values. This results in subsequent processing of the spent photographic solution before it can be discharged into a sewer.

Therefore, it is an object of the present invention to provide a non-electric silver reclamation system for spent photographic solution that effectively removes silver from the photographic solution so that the solution can be disposed of in a sewer.

SUMMARY OF THE INVENTION

The present invention is a silver reclamation system that includes a body defining a flow chamber, a plurality of metallic members positioned within the flow chamber and a receptacle positioned within the flow chamber. The body has a flow inlet and a flow outlet that are in fluid communication with the flow chamber. The receptacle defines a cavity which is in fluid communication with the flow outlet. The metallic mesh material is contained within the cavity whereby the plurality of metallic members and the receptacle are arranged so that a solution containing silver passes through the flow inlet into the flow chamber, around the plurality of metallic members, through the receptacle, into the cavity contacting the metallic mesh and through the flow outlet. The present invention is also a method for reclaiming silver contained within a photographic solution made up of an acid including the steps of: passing the photographic solution across a metallic member which is less reactive with the photographic solution than silver; plating the metallic members with a portion of the silver contained in the photographic solution; passing the photographic solution through a metallic mesh which is less reactive with the photographic solution than silver; plating a portion of the mesh with a portion of the silver contained in the photographic solution; filtering the photographic solution to remove suspended solids of silver contained in the photographic solution; and discharging the photographic solution.

DESCRIPTION OF THE PREFERRED EMBODIMENTS

Figure 1:
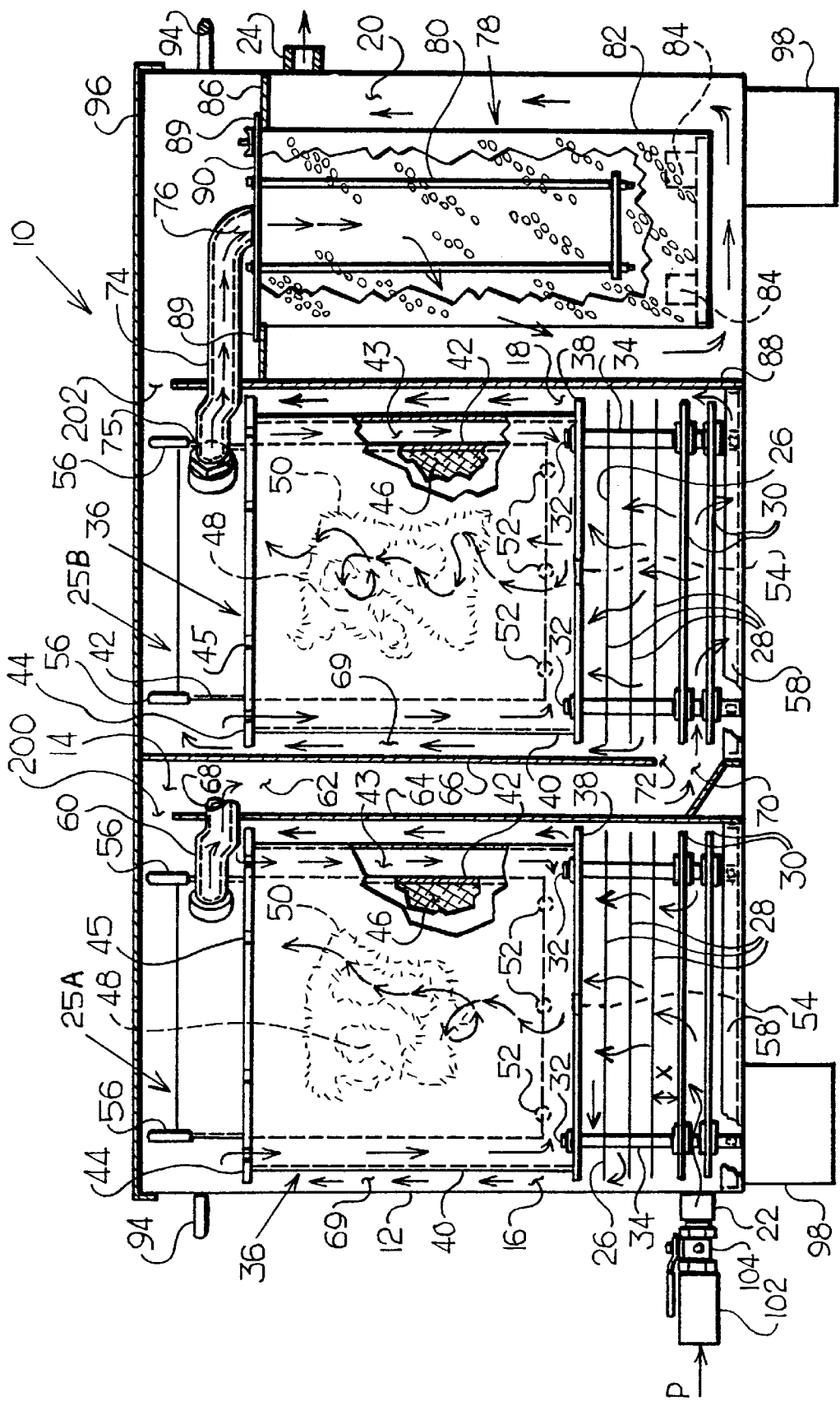
FIG. 1 is an elevational view, partially in section, of a silver reclamation system made in accordance with the present invention.
Figure 2:
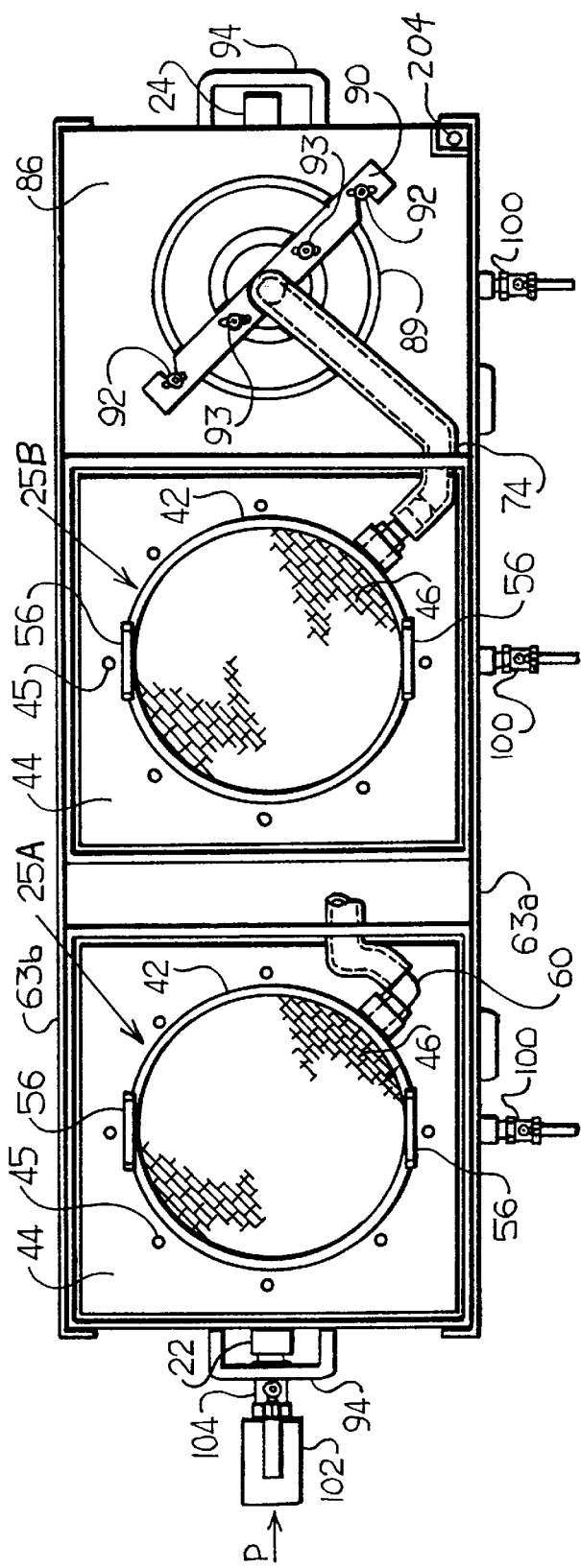
FIG. 2 is a top plan view of the silver reclamation system shown in FIG. 1 without a lid.

FIGS. 1 and 2 show a silver reclamation system 10 made in accordance with the present invention. Specifically, the silver reclamation system 10 includes an open top rectangular-shaped body 12 defining a flow chamber 14. The flow chamber 14 includes a first deposition chamber 16 in fluid communication with a second deposition chamber 18, which is in fluid communication with a filter chamber 20. The body 12 also includes a fluid inlet 22 in fluid communication with the first deposition chamber 16 and a fluid outlet 24 in fluid communication with the filter chamber 20. An open and close type valve, such as a ball valve, is connected to the fluid inlet 22 to permit the flow of fluid through the body 12.

Figure 3:
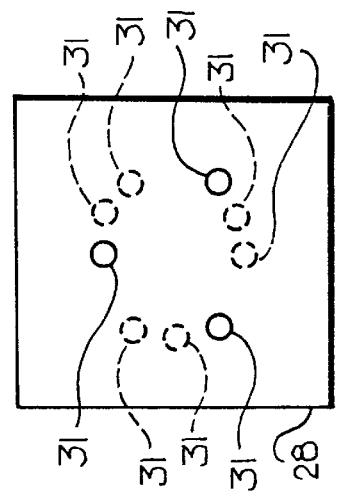
FIG. 3 is a top plan view of a plurality of stacked plates provided with the silver reclamation system shown in FIGS. 1 and 2.

Silver reclamation stack assemblies 25A and 25B are received within the first deposition chamber 16 and the second deposition chamber 18, respectively. Each stack assembly 25A and 25B includes a plurality of spaced apart, horizontally extending metallic members or plates 26. Specifically, the five metallic plates 26 are spaced a vertical distance X apart. The dimensions of the plates 26 can vary, such as, for example, having a length and width of twelve inches and a thickness of 0.05 inch. The vertical spacing can vary from plate to plate. The upper three metallic plates are flat plates 28 and are substantially solid, each having three holes arranged in a triangle pattern. The lower two plates are perforated plates 30, such as a screen or mesh. Each of the three plates 28 define three spaced apart holes 31 as shown in FIG. 3. The orientation of the holes 31 varies or is staggered so that the holes 31 are not coaxial with each other. This arrangement causes photographic fluid to flow around the plates 28. Preferably, the plates 28 and 30 are made of aluminum, copper, stainless steel, titanium and/or MONEL® material, which are reactive with the photographic solution. By reactive, it is meant that the acid in the photographic solution will react with the plates 26 so that ions from the plates 26 interact with the silver in solution, for example, by a conventional oxidation-reduction reaction, to precipitate and/or plate the plates 26 with silver. Preferably, all of the plates in each stack assembly 25A and 25B are made of the same material. The plates 28 and 30 are mounted in a spaced relationship by vertically extending posts 32 that pass through the plates 28 and 30. Spacers 34 are received by the posts 32 and maintain the plates 28 and 30 in the spaced relationship.

A receptacle 36 is positioned above the plates 28 and 30. The receptacle 36 includes a circular bottom plate 38 secured to the posts 32. An outer annular shell 40 is secured at a bottom edge to the bottom plate 38. An inner annular shell 42 is positioned within an interior space defined by the outer annular shell 40. An annular passageway 43 is defined between the outer annular shell 40 and the inner annular shell 42. A top plate 44 is secured to an upper edge of the outer annular shell 40 and the inner annular shell 42. A plurality of circumferentially spaced holes 45 are defined in the top plate 44 so that the passageway 43 is in fluid communication with the first deposition chamber 16 via the holes 45. A filter bag 46, such as a filter bag manufactured by Filtration Plus, Inc., 4208 N-900, West Michigan City, Ind. 46360, is received within a cavity 48 defined by an inner surface of the inner annular shell 42. A mesh material 50, such as steel mesh, stainless steel mesh or copper mesh, is received within the filter bag 46. Preferably, the mesh material is an annular shape and is formed by rolling copper mesh together with stainless steel mesh and/or steel mesh. A plurality of support bars 52 is secured to a lower edge of the inner annular shell 42, whereby the filter bag 46 containing the mesh material 50 rests thereon. A pair of handles 56 are secured to an upper portion of the inner annular shell 42. Lower ends of the posts 32 are secured to a tray 58. A hole 54 defined in the bottom plate 38 provides drainage of the cavity 48 when the stack assemblies 25A or 25B are removed or the flow chamber 14 is drained.

Referring to the first deposition chamber 16, a conduit 60, such as a plastic hose, is provided having one end secured to an upper portion of the inner annular shell 42. The cavity 48 is in fluid communication with the conduit 60. A second end of the conduit 60 is positioned at an upper portion of a first flow passageway 62. The first flow passageway 62 is defined by sidewalls 63a and 63b (as shown in FIG. 2) of the body 12, a wall 64 and a wall 66, which are secured to the body 12 and are shown in FIG. 1. Specifically, the conduit 60 terminates at an entry end 68 of the first flow passageway 62. The first flow passageway 62 terminates at an exit end 70 positioned below the entry end 68. Another passageway 69 is defined between an outer surface of the outer annular shell 40 and the walls defining the first deposition chamber 16.

The exit end 70 of the first flow passageway 62 corresponds to an entry end 72 into the second deposition chamber 18. As previously stated, the second deposition chamber 18 includes the stack assembly 25B having the previously described receptacle 36, where like reference numerals represent like elements. One difference between stack assembly 25A and stack assembly 25B is that plates 28 and 30 and mesh material 50 may be made of different materials, such as, for example, mesh material 50 of stack assembly 25A may be made of copper mesh and mesh material 50 of stack assembly 25B may be made of steel mesh. Alternatively, the mesh material 50 can be made of the same combinations of mesh material previously discussed. A conduit or flow outlet 74, such as a plastic hose, is secured at a first end to an upper portion of the inner annular shell 42. The conduit 74, which defines a second passageway, has an inlet end 75 and terminates at an exit end 76 which is connected to a filter arrangement 78 positioned within the filter chamber 20. Thus, the cavity 48 of the inner annular shell 42 positioned in the second deposition chamber 18 is in fluid communication with the filter arrangement 78 through the conduit 74. In this arrangement, the entry end 68 of the first flow passageway 62 is positioned above the fluid inlet 22 and the exit end 70 and the inlet end 75 of the conduit 74 is positioned above the exit end 70.

The filter arrangement 78 includes a first tubular-shaped cartridge filter 80 positioned within a second tubular-shaped bag filter 82. The first filter 80 preferably has a three micron rating which is larger than the micron rating of the bag of the second filter 82, which is preferably a one micron rating. Hence, the first filter 80 is adapted to filter out large particles prior to the particles coming in contact with the second filter 82 thereby prolonging the life of the second filter 82. A plurality of magnets 84 is positioned within the second filter 82. A plate 86 having an annular hole defined therein and a wall 88 are secured to the body 12 and define the filter chamber 20. The first filter 80 and the second filter 82 pass through the hole defined in the plate 86. An annular lip 89 is provided on the second filter 82. The annular lip 89 is sandwiched between an upper surface of the plate 86 and a hold down bar 90 as shown in FIG. 2. The hold down bar 90 is removably secured to the plate 86 by fasteners 92, such as wing nuts, received by threaded members secured to the plate 86. Likewise, the first filter 80 can be removably secured to the hold down bar 90 by fasteners 93.

Handles 94 are secured to opposite ends of the body 12 for ease in lifting the silver reclamation system 10. A removable lid 96 is received by an upper portion of the body 12. Legs 98 (for example, four) are provided to support the body 12 on a supporting surface, such as a floor. Optionally, three drain valves 100, such as ball valves, can be provided on a lower portion of the wall 63a and are in fluid communication with the first deposition chamber 16, the second deposition chamber 18 and the filter chamber 20, respectively. The drain valves 100 are provided for quickly draining photographic solution contained within the body 12, if necessary. Preferably, the drain valves 100 are adapted to couple to a vacuum type cleaner to withdraw the photographic solution contained within the body 12.

In operation, some spent photographic solutions may include a majority of suspended large crystals of silver bromide from the photographic film on the order of about ten to twenty-five microns. In other solutions, a majority of silver may be in the form of total dissolved silver solids. The silver is typically suspended and dissolved in ammonium thiosulfate, which is made up of ammonium sulfate, acetic acid, sulfuric acid and water. The ammonium thiosulfate typically has a pH of between 4–5 and, preferably, between 4.2–4.7.

Referring to FIG. 1, initially unfiltered photographic solution P may optionally flow through a filter 102 which is a bag filter having a one micron rating so as to remove particles larger than one micron from the photographic solution P. Filter 102 is an optional filter and may, in some instances, need not be used. The photographic solution P passes through the filter chamber 20 into the first deposition chamber 16. The photographic solution P flows through the perforated plates 30 and through the staggered holes 31 defined in plates 28 as indicated by the arrows. This arrangement permits the photographic solution P to maximize contact with the plates 28 and 30 which causes an ion exchange between the plates 28 and 30 and the dissolved silver in the photographic solution P and causes the silver crystals to form and/or silver to plate the plates 28 and 30. The photographic solution P then flows up passageway 69, flows through holes 45, flows down passageway 43, and flows through the filter bag 46 entering at a bottom of the filter bag 46. The photographic solution P contacts and coacts with the mesh material 50 and then flows through the conduit 60. During the process, the silver in the solution reacts with the mesh material 50 and the plates 28 and 30 causing the silver in the solution to plate or coat the plates 28 and 30 and the mesh material 50 as well as to crystallize. The smaller crystals either continue to travel with the photographic solution P, fall onto the plates 28, the tray 58 or are retained within the filter bag 46.

The photographic solution P then flows down the first flow passageway 62 and into the second deposition chamber 18. As previously discussed, the photographic solution P flows around the plates 28 and 30 as indicated by the arrows and flows through passageway 69, flows through holes 45 and flows through the passageway 43. The photographic solution P then flows through the filter bag 46 and contacts the mesh material 50 located in the second deposition chamber 18 and then flows through the conduit 74. The photographic solution P further reacts with the plates 28 and 30 and the mesh material 50 removing additional silver from the photographic solution P.

The photographic solution P then flows from the conduit 74 into the filter arrangement 78. Specifically, the photographic solution P passes through the first filter 80 which removes particles having a size greater than three microns. Further, the photographic solution P contacts the magnets 84 onto which any iron particles in the solution are attracted to. The photographic solution P then passes through the second filter 82 removing particles having a size down to one micron. The filter photographic solution P then exits the fluid outlet 24. Preferably, the photographic solution intermittently flows through the silver reclamation system 10.

As stated earlier, the plates 28 and 30 can be made of metals, such as aluminum, stainless steel or copper. Preferably, all of the plates 28 and 30 in a particular deposition chamber are made of the same metal and the plates 28 and 30 of the other deposition chamber are made of a different metal. Preferably, high nickel-molybdenum content stainless steel should be used in the plates, such as types 316, 321, 329, or 347 or titanium. These materials react in a conventional manner with the photographic solution causing the plating and the crystallization of the silver from the photographic solution. The remainder of the components of the silver reclamation system 10 can also be made of stainless steel, such as type 304, or other non-reactive materials, such as plastic or rubber. Preferably, the mesh material 50 is made of a copper alloy that includes copper, MONEL® and stainless steel such as that manufactured by ACS Industries, Inc., 14208 Industry Road, Houston, Tex. 77053. Like the plates 28 and 30, these materials react with the photographic solution causing plating and crystallization of the silver from the photographic solution. Preferably, MONEL® should be used in lieu of copper. MONEL®, which is known as a red metal, appears to last longer in the present application than pure copper. The above metals are less reactive with the photographic solution than the silver contained therein. This permits the silver to plate the above metal plates and precipitate out of solution.

After a certain period of time, say one to two months, filter bags 46, first filter 80 and second filter 82 must be removed to process the accumulated silver and plated silver. Specifically, the inlet ball valve 104 is moved from an open position to a closed position and the drain valves 100 may be moved from a closed position to an open position thereby draining the body 12 of photographic solution through a vacuum. Filter bags 46, first filter 80 and second filter 82 are removed and sent to a processor for processing to refine the silver particles into silver. It is believed that after every two years, the plates 28 and 30 should be replaced and are sent to a processor to remove plated silver in a manner well known in the art. Any solid debris collected on trays 58 can also be removed for processing. In the case of the mesh material 50, the silver not only plates or coats the mesh material 50, but also is contained therein in particle form.

As stated previously, the filters should be changed periodically. In some cases, one or more of the filters may become clogged hindering the flow of the photographic solution P therethrough. The present invention has a bypass arrangement should this occur, which is discussed below.

Should the filter bag 46, positioned in the first deposition chamber 16 become clogged, then a level of photographic solution P in the first deposition chamber 16 will rise until it flows through a passageway 200 defined between an upper end of wall 64 and the lid 96. The photographic solution P then will flow down the first flow passageway 62. Likewise, should the filter bag 46, positioned in the second deposition chamber 18 become clogged, then a level of the photographic solution P in the second deposition chamber 18 will rise until it flows through a passageway 202 defined between an upper end of wall 88 and the lid 96. The photographic solution P will then flow into an upper portion of the filter chamber 20 and flow through a hole 204 defined in the plate 86 and then flow out the fluid outlet 24. As can be seen in FIG. 2, a raised lip surrounds the hole 204, which has an edge positioned a distance above the plate 86. Should the filter arrangement 78 become clogged, then photographic solution P will be prevented from flowing through the conduit 74, which will prevent photographic solution P from flowing through the filter bag 46 located in the second deposition chamber 18. This will cause the level of the photographic solution in the second deposition chamber 18 to rise and then exit through the passageway 202, rise above the edge of the lip, pass through the hole 204 and exit the fluid outlet 24. This bypass arrangement prevents a fluid backup from occurring whereby photographic solution P from an x-ray processing machine will not overflow because of clogged filters. Also, this bypass arrangement prevents an overflow condition from occurring in the silver reclamation system 10, whereby photographic solution P could flow over body 12 and flow onto a floor. Photographic solution spilled on a floor can be hazardous.

FIGS. 1 and 2 show a three chamber system having two deposition chambers. The number of deposition chambers can be decreased or increased to accommodate lower or higher concentrations of silver in the photographic solution and/or decreased or increased flow rates, for example: a two deposition chamber arrangement, as shown in FIGS. 1 and 2, can accommodate zero to five gallons per day; a three deposition chamber unit can accommodate five to ten gallons of photographic solution per day; and a four deposition chamber unit can accommodate ten to twenty gallons of photographic solution per day. Typically, the photographic solution is supplied to the fluid inlet from a gravity feed system where the x-ray processing machine is positioned above the body 12. It is believed that the silver reclamation system as described above can remove a majority of silver in photographic solution and provide a solution that can be disposed either directly into a sewer or, through the addition of tap water, can be disposed into a sewer.

Table I shows test results of a two deposition chamber unit, such as shown in FIGS. 1 and 2, wherein the plates 26 of the first deposition chamber 16 were made of MONEL® and the plates 26 of the second deposition chamber 18 were made of aluminum, wherein the plates were square and had dimensions of twelve inches by twelve inches.

TABLE I

| Test | Inlet Concentration of Silver | Exit Concentration of Silver |
|---|---|---|
| Test 1 | 250 mg/liter | 28.7 mg/liter |
| Test 2 | 210 mg/liter | 4.65 mg/liter |
| Test 3 | 305 mg/liter | 5.25 mg/liter |
| Test 4 | 290 mg/liter | 4.95 mg/liter |
| Test 5 | 615 mg/liter | 24.7 mg/liter |
| Test 6 | 550 mg/liter | 5.15 mg/liter |
| Test 7 | 495 mg/liter | 5.85 mg/liter |
| Test 8 | 535 mg/liter | 5.78 mg/liter |
| Test 9 | 635 mg/liter | 5.65 mg/liter |
| Test 10 | 535 mg/liter | 104 mg/liter |
| Test 11 | 488 mg/liter | 113 mg/liter |

Tests 1–9 occurred over a forty-five day period, test 10 occurred sixty days after installation, and test 11 occurred sixty-five days after installation. Flow rate and concentration varied.

It is believed that the filters should be replaced every thirty-five days and the exiting photographic solution should be diluted with tap water so that the diluted solution can be disposed in a sewer. As is now evident, the present invention silver reclamation system effectively removes silver from the photographic solution P without the need of electricity and can result in a filtered solution which can be directly disposed of into a sewer or, alternatively, can be diluted with water for disposal. As can be seen, the efficiency of the silver reclamation system 10 decreases over a period of time as the plates 28 and 30 and the mesh material 50 become plated with silver, which indicates that these elements must be replaced. We have learned that the filter bag in the first filter deposition chamber will be spent prior to the filter bags in the other deposition chambers. Hence, it may not be necessary to dispose of all of the filter bags at the same time. We believe that, alternatively, only the spent filter bag(s) need to be disposed of and the position of remaining filter bag(s) may be moved to the preceding deposition chamber(s). Preferably, the filter bag in the first deposition chamber should be replaced with a new filter bag and any other spent filter bags also are removed. The remaining non-spent filter bag(s) is/are moved to a preceding deposition chamber(s) and a new filter bag(s) is/are positioned in the last deposition chamber(s). After a certain period of time, this process is repeated.

Figure 5:
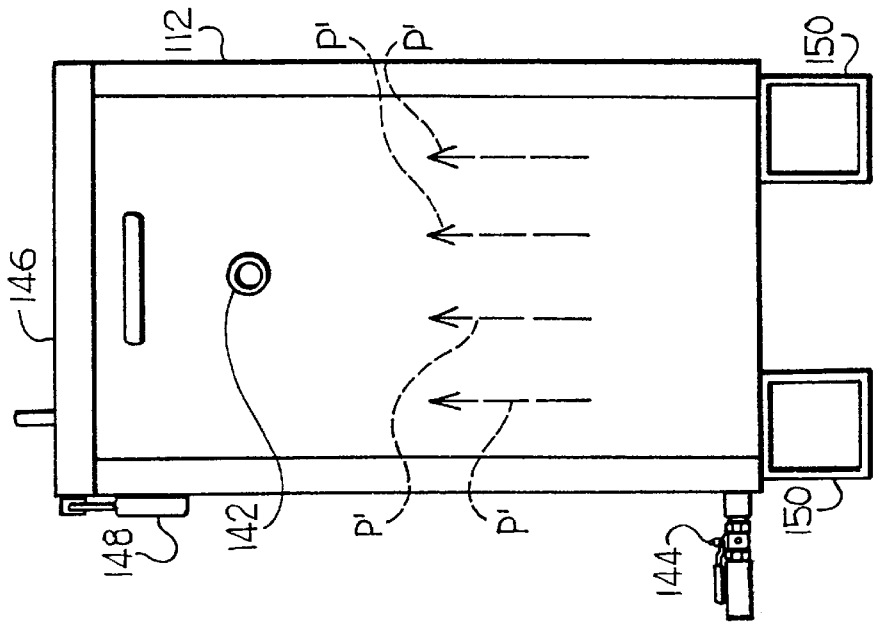
FIG. 5 is a side elevational view of the silver reclamation system shown in FIG. 4.
Figure 4:
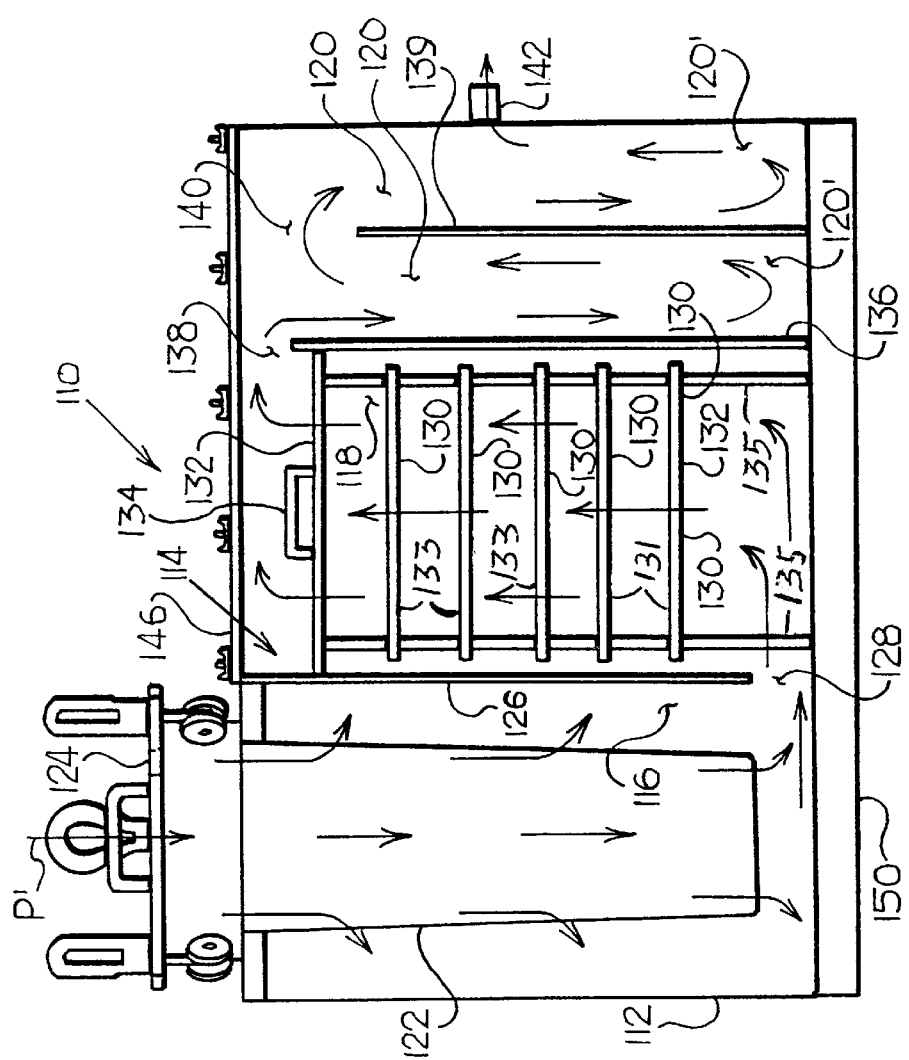
FIG. 4 is a front elevational view, partially in section, of another embodiment of a silver reclamation system made in accordance with the present invention.

FIGS. 4 and 5 show a second embodiment of a silver reclamation system 110 made in accordance with the present invention for silver in suspension only. Specifically, the silver reclamation system 110 includes a body 112 defining a flow chamber 114 including a filter chamber 116, a deposition chamber 118 and a plurality of settling chambers 120. A removable one micron bag filter 122, such as made of polyethylene, is positioned with the filter chamber 116. An inlet 124 is defined within the body 112 and is in fluid communication with the filter bag 122. A wall 126 is secured to the body 112 and defines a passageway 128 at a lower portion of the body 112.

The deposition chamber 118 includes one or more horizontally extending plates 130 made of an iron based metal or a copper based metal. The plates 130 are secured to a bracket 132 having a handle 134. The second deposition chamber 118 is defined by the body 112, the wall 126 and a wall 136 defining a passageway 138.

The settling chamber 120, which includes two sections 120', is defined by the body 112, the wall 136 and a baffle 139 that defines a passageway 140. An exit port 142 is attached to the body 112 and is in fluid communication with the settling chamber 120. An optional drain valve 144, such as a ball valve, is provided at a lower portion of the body 112 which enables draining of the body 112. A lid 146 is removably secured to the body 112 and can be secured to the body 112 by a lock 148. Legs 150 are secured to the body 112 and support the silver reclamation system 110 on a supporting surface, such as a floor.

In operation, spent photographic solution P' enters the inlet 124 and flows through the filter bag 122 filtering out particles greater than one micron. Preferably, the photographic solution enters through a gravity feed system; however, photographic solution P' could be provided via a pump. The photographic solution P' flows into the filter chamber 116 and through the passageway 128 into the second deposition chamber 118. The photographic solution P' passes along the horizontally extending plates 130. The horizontally extending plates 130 include perforated plates 131 and solid plates 133, which are the same as plates 28 and 30, respectively. Plates 130 are arranged so that holes 31 are staggered as previously described. The plates are secured to each other by posts 135. The photographic solution P' reacts with and plates the horizontally extending plates 130. The photographic solution P' then flows through the passageway 138 into the settling chamber 120. Solids settle in both of the settling chamber sections 120'. The photographic solution P' then exits the exit port 142 in which a substantial amount of silver has been removed.

After a period of time, the filter bag 122 can be removed and replaced. Also, the lid 146 can be removed and the plated horizontally extending plates 130 can be removed via the handle 134 and replaced. Further, the body 112 can be drained via drain valve 144 so that solid silver particles accumulated within the body 112 can be removed. The removed particles, the filter bag 122 and the removed horizontally extending plates 130 are then sent to a processor for processing of the silver.

Having described the presently preferred embodiments of the invention, it is to be understood that they may otherwise be embodied within the scope of the appended claims.

We claim:

1. A silver reclamation system, comprising:
   a body defining a flow chamber, said body having a flow inlet and flow outlet which are in fluid communication with the flow chamber;
   a plurality of metallic members positioned within the flow chamber;
   a receptacle positioned within the flow chamber, said receptacle defining a cavity which is in fluid communication with said flow outlet;
   a metallic mesh material contained within the cavity whereby said plurality of metallic members and said receptacle are arranged so that a solution containing silver passes through the flow inlet into the flow chamber around said plurality of metallic members through said receptacle into the cavity contacting said metallic mesh and through said flow outlet; and
   a filter in fluid communication with said flow outlet, wherein said filter comprises a first filter member having a first filter mesh size and a second filter member having a second filter mesh size, wherein the first filter mesh size is larger than the second filter mesh size, said first filter member and said second filter member adapted to filter solids from the solution whereby the solution exiting said flow outlet passes through said first filter member and then through said second filter member.

2. A silver reclamation system as claimed in claim 1, wherein said metallic members are plates.

3. A silver reclamation system as claimed in claim 2, wherein said metallic members are perforated plates.

4. A silver reclamation system as claimed in claim 1, wherein said plurality of members comprise solid plates and perforated plates.

5. A silver reclamation system as claimed in claim 1, wherein at least one of said plurality of metallic members is selected from the group consisting of aluminum, iron and copper.

6. A silver reclamation system as claimed in claim 1, wherein at least one of said plurality of metallic members comprise copper.

7. A silver reclamation system as claimed in claim 1, wherein said metallic mesh comprises stainless steel.

8. A silver reclamation system as claimed in claim 7, wherein said metallic mesh comprises copper.

9. A silver reclamation system as claimed in claim 7, wherein said metallic mesh comprises copper and stainless steel.

10. A silver reclamation system as claimed in claim 1, wherein said filter defines a filter cavity in fluid communication with said flow outlet, said silver reclamation system further comprising a magnet provided within said filter cavity.

11. A silver reclamation system, comprising:
    a body defining a first deposition chamber and a filter chamber, a fluid inlet and a fluid outlet secured to said body, wherein said fluid inlet is in fluid communication with the deposition chamber and said fluid outlet is in fluid communication with the filter chamber;
    a plurality of metallic members secured to said body and provided within the deposition chamber, wherein said metallic members are spaced apart, flat and secured to said body by posts;
    a receptacle provided within the deposition chamber, wherein said receptacle positioned above said metallic members;
    a metallic mesh material provided within said receptacle;
    a flow outlet in fluid communication with said receptacle; and
    a filter provided in the filter chamber, said flow outlet in fluid communication with said filter, wherein said filter includes a first tubular-shaped filter member having a first filter mesh size positioned within a second tubular-shaped filter member having a second filter mesh size, and wherein the first filter mesh size is larger than the second filter mesh size, said fluid outlet in fluid communication with said first filter member.

12. A silver reclamation system as claimed in claim 11, wherein said body defines a second deposition chamber in fluid communication with the first deposition chamber, a second plurality of metallic members secured to said body and positioned within the second deposition chamber;
    a second receptacle provided within the second deposition chamber;
    a second metallic mesh material provided within said second receptacle; and
    a first flow passageway defined in said first deposition chamber and in fluid communication with the second deposition chamber and a second flow passageway defined in the second deposition chamber in fluid communication with the filter chamber.

13. A silver reclamation system as claimed in claim 12, wherein said first passageway has an entry end and an exit end and said second passageway has an entry end and an exit end, wherein said first passageway entry end is positioned above said fluid inlet and said second passageway entry end is positioned above said first passageway exit end.

14. A silver reclamation system, comprising:
    a body defining a flow chamber, said body having a flow inlet and flow outlet which are in fluid communication with the flow chamber;
    a plurality of metallic members positioned within the flow chamber;
    a receptacle positioned within the flow chamber, said receptacle defining a cavity which is in fluid communication with said flow outlet;
    a metallic mesh material contained within the cavity whereby said plurality of metallic members and said receptacle are arranged so that a solution containing silver passes through the flow inlet into the flow chamber around said plurality of metallic members through said receptacle into the cavity contacting said metallic mesh and through said flow outlet;
    a filter receiving said metallic mesh and positioned within the cavity; and
    a bypass passageway defined within said body in fluid communication with said inlet and said outlet, whereby if said filter becomes clogged, the solution flowing from the inlet to the outlet bypasses said filter and flows through the bypass passageway.

15. A silver reclamation system, comprising:
    a body defining a first deposition chamber and a filter chamber, a fluid inlet and a fluid outlet secured to said body, wherein said fluid inlet is in fluid communication with the deposition chamber and said fluid outlet is in fluid communication with the filter chamber;
    a plurality of metallic members secured to said body and provided within said first deposition chamber;
    a receptacle provided within said first deposition chamber;
    a metallic mesh material provided within said receptacle;
    a flow outlet in fluid communication with said receptacle;
    a first filter provided in the filter chamber, said flow outlet in fluid communication with said first filter;
    a second filter receiving said metallic mesh and positioned within the receptacle; and
    a bypass passageway defined within said body in fluid communication with said fluid inlet and said fluid outlet, whereby if one of said first filter and said second filter becomes clogged, the solution flowing from the inlet to the outlet bypasses said one of said first filter and said second filter provided in said filter chamber and said first deposition chamber and flows through the bypass passageway.

16. A silver reclamation system, comprising:
    a body defining a flow chamber, said body having a flow inlet and flow outlet which are in fluid communication with the flow chamber;
    a plurality of metallic members positioned within the flow chamber;
    a receptacle positioned within the flow chamber, said receptacle defining a cavity which is in fluid communication with said flow outlet;
    a metallic mesh material contained within the cavity whereby said plurality of metallic members and said receptacle are arranged so that a solution containing silver passes through the flow inlet into the flow chamber around said plurality of metallic members through said receptacle into the cavity contacting said metallic mesh and through said flow outlet;
    a filter in fluid communication with said flow outlet, wherein said filter defines a filter cavity in fluid communication with said flow outlet; and
    a magnet provided within said filter cavity.

* * * * *